United States Patent
Dauer et al.

(10) Patent No.: US 11,932,753 B2
(45) Date of Patent: Mar. 19, 2024

(54) SILANE, RUBBER MIXTURE CONTAINING THE SILANE, AND VEHICLE TIRE HAVING THE RUBBER MIXTURE IN AT LEAST ONE COMPONENT

(71) Applicant: Continental Reifen Deutschland GmbH, Hannover (DE)

(72) Inventors: David-Raphael Dauer, Garbsen (DE); Andreas Jacob, Hannover (DE); Julian Strohmeier, Einbeck (DE)

(73) Assignee: Continental Reifen Deutschland GmbH, Hannover (DE)

(*) Notice: Subject to any disclaimer, the term of this patent is extended or adjusted under 35 U.S.C. 154(b) by 863 days.

(21) Appl. No.: 16/978,841

(22) PCT Filed: Feb. 19, 2019

(86) PCT No.: PCT/EP2019/054015
§ 371 (c)(1),
(2) Date: Sep. 8, 2020

(87) PCT Pub. No.: WO2019/174865
PCT Pub. Date: Sep. 19, 2019

(65) Prior Publication Data
US 2021/0206948 A1 Jul. 8, 2021

(30) Foreign Application Priority Data
Mar. 12, 2018 (DE) .................. 10 2018 203 650.0

(51) Int. Cl.
*C08K 9/06* (2006.01)
*B60C 1/00* (2006.01)
*C07F 7/18* (2006.01)
*C08K 3/36* (2006.01)
*C08K 5/548* (2006.01)

(52) U.S. Cl.
CPC ............. *C08K 9/06* (2013.01); *B60C 1/0016* (2013.01); *C07F 7/1804* (2013.01); *C08K 3/36* (2013.01); *C08K 5/548* (2013.01); *B60C 2001/0033* (2013.01)

(58) Field of Classification Search
None
See application file for complete search history.

(56) References Cited

U.S. PATENT DOCUMENTS

| 4,229,333 A | 10/1980 | Wolff et al. |
| 2003/0225195 A1 | 12/2003 | Cruse et al. |
| 2007/0185279 A1* | 8/2007 | Cruse ................ C07F 7/04 528/30 |

(Continued)

FOREIGN PATENT DOCUMENTS

| CA | 991836 A | 6/1976 |
| CN | 104024317 A | 9/2014 |

(Continued)

OTHER PUBLICATIONS

Clarivate Analytics / WPI 2017—XP-002791047.
(Continued)

*Primary Examiner* — Robert T Butcher
(74) *Attorney, Agent, or Firm* — Richard A. Wolf; Gregory Adams

(57) ABSTRACT

The invention relates to a silane, to a rubber mixture containing the silane and to a vehicle tire comprising the rubber mixture in at least one component.
The silane according to the invention has the following formula I)

$$(R^1)_o Si\text{—}R^2\text{—}X\text{-}A\text{-}Y\text{—}[R^7\text{—}Y\text{—}]_m\text{—}R^7\text{—}S\text{-}G, \quad \text{I})$$

wherein according to the invention it has a spacer group between the silyl group and the S-G moiety, wherein the spacer group has an aromatic group A and at least one further aromatic group and/or an alkylene group and also the linking units X and Y, wherein the group X is selected from the groups —HNC(=O)—, —C(=O)NH—, —C(=O)O—, —OC(=O)—, —OC(=O)NH—, —HNC(=O)O—, —$R^3$NC(=O)N$R^3$—, —$R^3$NC(=N$R^3$)N$R^3$—, —$R^3$NC(=S)N$R^3$—, wherein at least one $R^3$ within the group X is a hydrogen atom, and wherein the groups Y are selected from the groups —HNC(=O)—, —C(=O)NH—, —C(=O)O—, —OC(=O)—, —OC(=O)NH—, —HNC(=O)O—, —$R^4$NC(=O)N$R^4$—, —$R^4$NC(=N$R^4$)N$R^4$—, —$R^4$NC(=S)N$R^4$—, wherein at least one $R^4$ within each group Y is a hydrogen atom, and wherein the radicals $R^7$ are selected from aromatic groups A and alkylene radicals having 1 to 20 carbon atoms, which may have cyclic, branched and/or aliphatically unsaturated groups; and wherein G is a hydrogen atom or a —C(=O)—$R^8$ group or a —Si$R^8_3$ group, wherein $R^8$ is selected from linear, branched and cyclic $C_1$-$C_{20}$-alkyl groups, $C_6$-$C_{20}$-aryl groups, $C_2$-$C_{20}$-alkenyl groups and $C_7$-$C_{20}$-aralkyl groups, and wherein m can take the values 0 to 4.
The rubber mixture according to the invention contains at least one silane according to the invention.

15 Claims, No Drawings

(56) References Cited

U.S. PATENT DOCUMENTS

| | | |
|---|---|---|
| 2008/0161452 A1 | 7/2008 | York et al. |
| 2008/0161460 A1 | 7/2008 | York et al. |
| 2008/0161462 A1 | 7/2008 | York et al. |
| 2008/0161475 A1 | 7/2008 | York et al. |
| 2009/0221751 A1 | 9/2009 | Hasse et al. |
| 2015/0005448 A1 | 1/2015 | Longchambon et al. |
| 2017/0073508 A1 | 3/2017 | Schwekendiek et al. |
| 2020/0392307 A1 | 12/2020 | Jacob et al. |

FOREIGN PATENT DOCUMENTS

| | | |
|---|---|---|
| CN | 110799353 A | 2/2020 |
| DE | 2255577 A1 | 6/1974 |
| DE | 2536674 A1 | 2/1977 |
| DE | 102006004062 A1 | 8/2007 |
| JP | 2002201312 A | 7/2002 |
| WO | 9909036 A1 | 2/1999 |
| WO | 2008083241 A2 | 7/2008 |
| WO | 2008083242 A1 | 7/2008 |
| WO | 2008083243 A1 | 7/2008 |
| WO | 2008083244 A1 | 7/2008 |
| WO | 2015172915 A1 | 11/2015 |

OTHER PUBLICATIONS

International Search Report dated May 17, 2019 of international application PCT/EP2019/054015 on which this application is based.
First Search dated Oct. 27, 2022 from corresponding Chinese patent application No. 201980016088.7.
First Office Action dated Nov. 2, 2022 from corresponding Chinese patent application No. 201980016088.7.
First Office Action dated Nov. 2, 2022 from corresponding Chinese patent application No. 201980016088.7 (Translated).
Chinese Office Action dated Mar. 24, 2023 corresponding to Chinese Application No. 201980016088.7.

* cited by examiner

SILANE, RUBBER MIXTURE CONTAINING THE SILANE, AND VEHICLE TIRE HAVING THE RUBBER MIXTURE IN AT LEAST ONE COMPONENT

The invention relates to a silane, to a rubber mixture containing the silane and to a vehicle tire comprising the rubber mixture in at least one component.

Silanes are known as additives for rubber mixtures, especially for vehicle tires, and in particular specifically for rubber mixtures containing at least one silica as filler. Silanes known from the prior art are disclosed, for example, in DE 2536674 C3 and DE 2255577 C3. The silica in this case is attached to the polymer(s) by means of such silanes, the silanes as a result also being referred to as coupling agents. The attachment of the silica by means of silane coupling agents is advantageous with respect to the rolling resistance characteristics and processability of the rubber mixture. To this end the silane typically has at least one sulfur moiety which takes part in the vulcanization of the rubber mixture.

In addition to the properties mentioned, however, other properties of the rubber mixture also play an important role, especially when being used in vehicle tires, such as in particular the stiffness of the mixture, which affects inter alia the handling characteristics of the vehicle tire.

WO 2015/172915 A1 discloses a rubber mixture comprising a urea-containing silane that has higher stiffness compared to the prior art with virtually unchanged indicators for rolling resistance and wet grip. The urea group is present here in the spacer, that is to say the spacer group between silicon (link to the filler) and sulfur (link to the diene rubber).

JP 2002-201312 A proposes silanes for rubber mixtures which have a urea moiety or an acid amide and a phenylene radical in the spacer group, as a result of which improved dispersion of carbon black or silica as fillers in the rubber mixture could be achieved.

The problem addressed by the present invention is that of providing a novel silane and a rubber mixture comprising the silane, by means of which a further improvement is achieved, compared to the prior art, in the profile of properties comprising the stiffness and thus in particular the handling predictors of the rubber mixture, in particular for application in vehicle tires.

The problem is solved by the silane according to the invention in accordance with claim 1, by the silica modified with the silane according to the invention, by the rubber mixture according to the invention containing the silane and also by the vehicle tire according to the invention and comprising the rubber mixture according to the invention in at least one component.

The silane according to the invention has the following formula I):

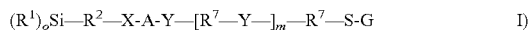

$(R^1)_o Si\text{—}R^2\text{—}X\text{-}A\text{-}Y\text{—}[R^7\text{—}Y\text{—}]_m\text{—}R^7\text{—}S\text{-}G$   I)

wherein o can be 1 or 2 or 3 (o is equal to 1 or 2 or 3) and the radicals $R^1$ within the silyl groups $(R^1)_o Si$— may be identical or different from each other and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides, or alkyl polyether groups —O—$(R^6$—O$)_r$—$R^5$ wherein $R^6$ are identical or different and are branched or unbranched, saturated or unsaturated, aliphatic, aromatic or mixed aliphatic/aromatic bridging $C_1$-$C_{30}$ hydrocarbon groups, preferably —$CH_2$—$CH_2$—, r is an integer from 1 to 30, preferably 3 to 10, and $R^5$ are unsubstituted or substituted, branched or unbranched, terminal alkyl, alkenyl, aryl or aralkyl groups, preferably —$C_{13}H_{27}$ alkyl group, or two $R^1$ form a cyclic dialkoxy group having 2 to 10 carbon atoms in which case o is <3 (o is less than 3), or two or more silanes of formula I) can be bridged via radicals $R^1$; and wherein the radical $R^2$ is selected from the group consisting of linear and branched alkylene groups having 1 to 20 carbon atoms, cycloalkyl groups having 4 to 12 carbon atoms, aryl groups having 6 to 20 carbon atoms, alkenyl groups having 2 to 20 carbon atoms, alkynyl groups having 2 to 20 carbon atoms and aralkyl groups having 7 to 20 carbon atoms; and wherein the group X is selected from the groups
—HNC(=O)—, —C(=O)NH—, —C(=O)O—, —OC(=O)—, —OC(=O)NH—,
—HNC(=O)O—, —$R^3$NC(=O)$NR^3$—, —$R^3$NC(=$NR^3$)$NR^3$—, —$R^3$NC(=S)$NR^3$—,
wherein the radicals $R^3$ within the group X may be identical or different and are selected from a hydrogen atom or as defined for $R^2$ under the condition that at least one $R^3$ within the group X is a hydrogen atom; and wherein the groups A within a molecule may be identical or different from each other and are aromatic groups, and wherein the radicals $R^7$ within a molecule may be identical or different and are selected from aromatic groups A and alkylene radicals having 1 to 20 carbon atoms, which may have cyclic, branched and/or aliphatically unsaturated groups; and wherein G is a hydrogen atom or a —C(=O)—$R^8$ group or a —$SiR^8_3$ group, wherein $R^8$ is selected from linear, branched and cyclic $C_1$-$C_{20}$-alkyl groups, $C_6$-$C_{20}$-aryl groups, $C_2$-$C_{20}$-alkenyl groups and $C_7$-$C_{20}$-aralkyl groups; and wherein the groups Y within a molecule may be identical or different from each other and are selected from the groups
—HNC(=O)—, —C(=O)NH—, —C(=O)O—, —OC(=O)—, —OC(=O)NH—,
—HNC(=O)O—, —$R^4$NC(=O)$NR^4$—, —$R^4$NC(=$NR^4$)$NR^4$—, —$R^4$NC(=S)$NR^4$—,
wherein the radicals $R^4$ within a group Y and within a molecule may be identical or different and are selected from a hydrogen atom or as defined for $R^2$ under the condition that at least one $R^4$ within each group Y is a hydrogen atom; and wherein m is an integer from 0 to 4, and wherein the silane may also be in the form of oligomers which are formed by hydrolysis and condensation of silanes of formula I).

In comparison to the silanes known from the prior art, the silane according to the invention having the group —$R^2$—X-A-Y—$[R^7$—Y—$]_m$—$R^7$— possesses a comparatively long and rigid spacer group which comprises an aromatic group A and at least one further aromatic group A and/or at least one alkylene group and also the linking units X and Y. The invention thus provides a novel silane. A rubber mixture containing the silane according to the invention has an optimized profile of properties comprising the stiffness, which profile could be attributed in particular to the aromatic group A present in combination with the linking units X and Y and the further aromatic group A and/or alkylene group within the spacer group. The rubber mixture according to the invention thus exhibits a certain improvement with respect to the profile of properties comprising handling predictors and the vehicle tire according to the invention displays inter alia improved handling characteristics.

The silane according to the invention and preferred embodiments thereof will be explained hereinafter. All aspects also apply to the silane in the rubber mixture according to the invention and in the vehicle tire according to the invention.

Within the context of the present invention, the terms "radical" and "group" are used synonymously in connection with chemical formula constituents.

As shown in formula I), the silane according to the invention is a mercaptosilane (G=hydrogen atom H) or a protected (also called blocked) mercaptosilane (G=—C(=O)—R$^8$ group or —SiR$^8_3$ group).

In formula I), m can take values from 0 to 4. The moiety [R$^7$—Y-] can thus in addition, where m=1, be present a further time in the molecule, where the R$^7$, independently of the R$^7$ indispensably present in accordance with the formula, is an aromatic group A or, as defined hereinabove, an alkylene group. In addition, where m=2 or 3 or 4, the number of the aromatic groups A and/or alkylene groups can increase accordingly.

In a preferred embodiment of the invention, m is equal to 0, that is to say it is preferable that m=0. Such a molecule is comparatively simple to produce, with the presence of the essence according to the invention of the molecule, namely the above-described combination of the aromatic group A with the further aromatic group A and/or the alkylene group and the linkages X and Y in the spacer group, so that optimized stiffness in the rubber mixture can be achieved by this alone.

As stated with regard to formula I), the group X is selected from the groups
—HNC(=O)—, —C(=O)NH—, —C(=O)O—, —OC(=O)—, —OC(=O)NH—,
—HNC(=O)O—, —R$^3$NC(=O)NR$^3$—, —R$^3$NC(=NR$^3$)NR$^3$—, —R$^3$NC(=S)NR$^3$—,
wherein the radicals R$^3$ within the group X may be identical or different and are selected from a hydrogen atom or as defined for R$^2$ under the condition that at least one R$^3$ within each group X is a hydrogen atom.

The groups —HNC(=O)— and —C(=O)NH— are carboxamide groups, with the two different notations being intended to express the possible connectivities within the molecule. It is thus conceivable that the nitrogen atom of group X in the acid amide embodiment links to the aromatic group A or to the radical R$^2$.

The groups —C(=O)O— and —OC(=O)— are ester groups, with the two notations here also referring to the different connectivities with respect to A and R$^2$, analogously to the acid amide groups.

The groups —OC(=O)NH— and —HNC(=O)O— are urethane groups, with the two notations here also referring to the different connectivities with respect to A and R$^2$, analogously to the acid amide groups.

The group —R$^3$NC(=O)NR$^3$— represents a urea group, where at least one of the radicals R$^3$ is a hydrogen atom.

The group —R$^3$NC(=NR$^3$)NR$^3$— represents a guanidine group, where at least one of the radicals R$^3$ is a hydrogen atom.

The group —R$^3$NC(=S)NR$^3$— represents a thiourea group, where at least one of the radicals R$^3$ is a hydrogen atom.

Preferably, each R$^3$ of group X is a hydrogen atom.

For the case where R$^3$ is an organic radical as defined for R$^2$, it is particularly preferable if R$^3$ is selected from alkyl radicals having 1 to 7 carbon atoms or aromatic radicals having 6 to 10 carbon atoms, such as for example a phenyl radical.

It is preferable for the group X to be selected from the groups —HNC(=O)—, —C(=O)NH—, —OC(=O)NH—, —HNC(=O)O—, —R$^3$NC(=O)NR$^3$—, —R$^3$NC(=NR$^3$)NR$^3$—, —R$^3$NC(=S)NR$^3$—, specifically subject to the condition given above for R$^3$.

The group X is particularly preferably selected from the groups —HNC(=O)—, —C(=O)NH—, —OC(=O)NH—, —HNC(=O)O—, —R$^3$NC(=O)NR$^3$—, preferably in turn from the groups —HNC(=O)—, —C(=O)NH—, —R$^3$NC(=O)NR$^3$—.

In a particularly advantageous embodiment of the invention, X is a urea group —HNC(=O)NH— where each R$^3$=a hydrogen atom.

As stated with regard to formula I), the groups Y within a molecule may be identical or different from each other and are selected from the groups
—HNC(=O)—, —C(=O)NH—, —C(=O)O—, —OC(=O)—, —OC(=O)NH—,
—HNC(=O)O—, —R$^4$NC(=O)NR$^4$—, —R$^4$NC(=NR$^4$)NR$^4$—, —R$^4$NC(=S)NR$^4$—,
wherein the radicals R$^4$ within a group Y and within a molecule may be identical or different and are selected from a hydrogen atom or as defined for R$^2$ under the condition that at least one R$^4$ within each group Y is a hydrogen atom.

The statements above with regard to X apply to the respective groups.

Each R$^4$ is also preferably a hydrogen atom in the respective groups. For the case where R$^4$ is an organic radical as defined for R$^2$, it is particularly preferable if R$^4$ is selected from alkyl radicals having 1 to 7 carbon atoms or aromatic radicals having 6 to 10 carbon atoms, such as for example a phenyl radical.

It is preferable for the groups Y to be selected from the groups
—HNC(=O)—, —C(=O) NH—, —OC(=O) NH—, —HNC(=O)O—, —R$^4$NC(=O) NR$^4$—,
—R$^4$NC(=NR$^4$)NR$^4$—, —R$^4$NC(=S)NR$^4$—, specifically subject to the condition given above for R$^4$.

The groups Y are particularly preferably selected from the groups
—HNC(=O)—, —C(=O) NH—, —OC(=O) NH—, —HNC(=O)O—, —R$^4$NC(=O) NR$^4$—, preferably in turn from the groups —HNC(=O)—, —C(=O)NH—, —R$^3$NC(=O)NR$^3$—.

In a particularly advantageous embodiment of the invention, Y is an acid amide group —HNC(=O)— or —C(=O)NH—.

Preference is given here to a connectivity that in the simple example where m=0 has the following appearance:

(R$^1$)$_o$Si—R$^2$—X-A-HN—C(=O)—R$^7$—S-G.

According to this preferred embodiment, the nitrogen atom of the acid amide group is thus attached to the aromatic group A which links X and Y.

The radicals R$^7$ within a molecule may be identical or different and are selected from aromatic groups A and alkylene radicals having 1 to 20 carbon atoms, which may have cyclic, branched and/or aliphatically unsaturated groups. For the case where $R^7$ are aromatic groups A, they are defined as the aromatic groups A described within the context of the present invention.

In a preferred embodiment of the invention, the radicals $R^7$ are linear or branched alkylene radicals having 1 to 20 carbon atoms, preferably 1 to 10 carbon atoms, particularly preferably 2 to 6 carbon atoms, or cycloalkyl groups having 4 to 8 carbon atoms.

In a particularly preferred embodiment of the invention, the radicals $R^7$ are alkylene groups having 2 to 4 carbon atoms, particularly preferably having 2 carbon atoms, that is to say in particular ethylene groups ($-CH_2-CH_2-$). In particular, with m=0, the radical $R^7$ is preferably an alkylene group having 2 to 4 carbon atoms, particularly preferably having 2 carbon atoms, that is to say in particular an ethylene group.

In a further preferred embodiment of the invention, the radicals $R^7$ are aromatic groups A, in particular when m=0.

The groups A are defined and selected as below.

The groups A connect X and Y and also possibly Y and S and Y and Y, with X and Y and possibly S thus each formally also being substituents of the respective aromatic group A.

The aromatic groups A may in principle be any aromatic group, wherein the A groups within a molecule may be identical or different from each other. The aromatic groups A here can contain heteroatoms and/or bear substituents (for a respective hydrogen atom) on one or more atoms of the aromatic skeleton, specifically in addition to the substituents X and Y according to the formula.

It is preferable for the aromatic groups A to be selected from the group consisting of phenylene, naphthylene, pyridyl, pyridazyl, pyrimidyl, pyrazyl, triazyl, quinolyl, pyrrolyl, furanyl, thiophenyl, pyrazolyl, imidazolyl, thiazolyl and oxazolyl radicals, and derivatives of the groups mentioned.

The groups mentioned can be linked to the respective aromatic group here via all conceivable atoms of the aromatic skeleton. In a monocyclic aromatic system having six atoms in the skeleton, such as a phenylene radical, this means for example that the groups can be arranged in a para, meta or ortho position relative to each other.

In a particularly advantageous embodiment of the invention, the groups A are phenylene radicals.

In a preferred embodiment of the invention, X and Y and also Y and S and also Y and Y, for the case where m=1 to 4 and $R^7$=A (aromatic group), are each arranged in para position relative to each other on the respective aromatic group A.

This results in an elongate and partially rigid molecular structure of the silane which especially in a rubber mixture can contribute to a further increase in the stiffness thereof.

In a further preferred embodiment of the invention, X and Y and also Y and Y, for the case where m=1 to 4 and $R^7$=A (aromatic group), are arranged in para position and Y and S are arranged in ortho position relative to each other on the respective aromatic group A.

This results in a partially rigid molecular structure of the silane which especially in a rubber mixture can contribute to an improvement in the properties thereof.

The radicals $R^1$ of the silane according to the invention within the silyl groups $(R^1)_oSi-$ may be identical or different from each other and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides, or alkyl polyether groups $-O-(R^6-O)_r-R^5$ wherein $R^6$ are identical or different and are branched or unbranched, saturated or unsaturated, aliphatic, aromatic or mixed aliphatic/aromatic bridging $C_1$-$C_{30}$ hydrocarbon groups, preferably $-CH_2-CH_2-$, r is an integer from 1 to 30, preferably 3 to 10, and $R^5$ are unsubstituted or substituted, branched or unbranched, terminal alkyl, alkenyl, aryl or aralkyl groups, preferably $-C_{13}H_{27}$ alkyl group, or two $R^1$ form a cyclic dialkoxy group having 2 to 10 carbon atoms in which case o is <3 (o is less than three), or two or more silanes of formula I) can be bridged via radicals $R^1$.

All of the recited radicals $R^1$ and linkages may be combined with one another within a silyl group.

Where two silanes of formula I) are bridged to one other, they share a radical $R^1$. It is also possible for more than two silanes to be linked to one another in this way. Following the synthesis of the silane of formula I), it is therefore conceivable for two silanes of formula I) to be bridged to each other via the radicals $R^1$. It is also possible for more than two silanes to be linked to one another in this way, such as for example via dialkoxy groups.

The silane according to the invention may also comprise oligomers which are formed by hydrolysis and condensation of silanes of the formula I). This firstly encompasses oligomers of two or more silanes of formula I). According to the invention, secondly this also encompasses oligomers which are formed by condensation of at least one silane of formula I) with at least one further silane which does not correspond to formula I). The "further silane" may in particular be silane coupling agents known to those skilled in the art.

The silane of formula I) preferably comprises, in each silyl group $(R^1)_oSi-$, at least one radical $R^1$ which can serve as a leaving group, such as in particular alkoxy groups or any other of the mentioned groups that are bonded by an oxygen atom to the silicon atom, or halides.

The radicals $R^1$ preferably comprise alkyl groups having 1 to 6 carbon atoms or alkoxy groups having 1 to 6 carbon atoms, or halides, particularly preferably alkoxy groups having 1 to 6 carbon atoms.

In a particularly advantageous embodiment of the invention, the radicals $R^1$ within a silyl group $(R^1)_oSi-$ are identical and are alkoxy groups having 1 or 2 carbon atoms, that is to say methoxy groups or ethoxy groups, very particularly preferably ethoxy groups, where o=3 (o is equal to three).

However, including in the case of oligomers or if two $R^1$ form a dialkoxy group, the remaining radicals $R^1$ are preferably alkyl groups having 1 to 6 carbon atoms or halides or alkoxy groups having 1 to 6 carbon atoms, preferably 1 or 2 carbon atoms, that is to say methoxy groups or ethoxy groups, very particularly preferably ethoxy groups.

The radical $R^2$ of the silane according to the invention is selected from the group consisting of linear and branched alkylene groups having 1 to 20 carbon atoms, cycloalkyl groups having 4 to 12 carbon atoms, aryl groups having 6 to 20 carbon atoms, alkenyl groups having 2 to 20 carbon atoms, alkynyl groups having 2 to 20 carbon atoms and aralkyl groups having 7 to 20 carbon atoms.

It is preferable for the radical $R^2$ to be a linear or branched alkylene group having 2 to 8 carbon atoms or a cycloalkyl group having 4 to 8 carbon atoms, such as in particular a cyclohexyl radical.

In a particularly advantageous embodiment of the invention, $R^2$ is an alkylene radical having 2 to 6 carbon atoms, preferably 2 to 4 carbon atoms, especially preferably 2 or 3 carbon atoms, with a propylene radical having 3 carbon atoms being very particularly preferred.

In a particularly preferred and exemplary embodiment of the invention, the silane according to the invention has the following formula II):

II)

$$(EtO)_3Si\text{—}\cdots\text{—}N(H)\text{—}C(=O)\text{—}N(H)\text{—}\text{[phenylene]}\text{—}N(H)\text{—}C(=O)\text{—}\text{[phenylene]}\text{—}S\text{—}G.$$

In this case, with regard to formula I), m=0, all instances of $R^1$ are ethoxy groups, $R^2$ is a propylene radical, X is a urea group, $R^7$=A and both instances of A are phenylene radicals, wherein all linkages are arranged in para position and Y is an acid amide group the nitrogen atom of which is linked onto the respective phenylene radical in the direction of the urea group (X).

The moiety —S-G represents, as described above, a mercapto group, that is to say —S—H, or a blocked mercapto group, that is to say for example —S—C(=O)—$R^8$ or —S—SiR$^8_3$.

$R^8$ is selected from linear, branched and cyclic $C_1$-$C_{20}$ alkyl groups, $C_6$-$C_{20}$-aryl groups, $C_2$-$C_{20}$-alkenyl groups and $C_7$-$C_{20}$-aralkyl groups. Here, a radical $R^8$ may also comprise any desired combination of linear, branched and/or cyclic constituents.

The silane of formula II) represents a preferred example according to the invention. A particularly good profile of properties comprising the stiffness of the rubber mixture according to the invention is achieved with this. The latter also has improved properties with respect to the handling indicators.

In this case G is particularly preferably an alkanoyl group having a total of 1 to 10 carbon atoms.

In a preferred embodiment of the invention, G=H, that is to say a hydrogen atom.

In a further preferred embodiment of the invention, G is a —C(=O)—$R^8$ group, with $R^8$ particularly preferably being a $C_1$-$C_{20}$alkyl group; G is thus in this case preferably an alkanoyl group.

In an advantageous embodiment, the alkanoyl group has a total of 1 to 10, in particular 7 to 10 carbon atoms.

In a particularly preferred and exemplary embodiment of the invention, the silane according to the invention has the following formula III):

III)

$$(EtO)_3Si\text{—}\cdots\text{—}N(H)\text{—}C(=O)\text{—}N(H)\text{—}\text{[phenylene]}\text{—}N(H)\text{—}C(=O)\text{—}\text{[phenylene]}\text{—}S\text{—}C(=O)\text{—}(CH_2)_5CH_3.$$

In this case, with regard to formula I), m=0, all instances of $R^1$ are ethoxy groups, $R^2$ is a propylene radical, X is a urea group, $R^7$=A and both instances of A are phenylene radicals, wherein all linkages are arranged in para position and Y is an acid amide group the nitrogen atom of which is linked onto the respective phenylene radical in the direction of the urea group (X), and G is an octanoyl radical, that is to say an octanoyl protecting group.

In a further preferred and exemplary embodiment of the invention, $R^7$ is a linear alkylene radical, preferably having 2 to 6 carbon atoms.

In a further preferred and exemplary embodiment of the invention, $R^7$ is a linear alkylene radical, preferably having 2 to 6 carbon atoms, and G is an alkanoyl group, preferably having 2 to 10 carbon atoms.

In a further preferred and exemplary embodiment of the invention, the silane according to the invention has the following formula VIII):

VIII)

$$(EtO)_3Si\text{—}\cdots\text{—}N(H)\text{—}C(=O)\text{—}N(H)\text{—}\text{[phenylene]}\text{—}N(H)\text{—}C(=O)\text{—}CH_2CH_2\text{—}S\text{—}C(=O)CH_3.$$

In this case, with regard to formula I), m=0, all instances of $R^1$ are ethoxy groups, $R^2$ is a propylene radical, X is a urea group, $R^7$ is an ethylene radical and A is a phenylene radical, wherein the linkages are arranged in para position and Y is an acid amide group, and G is an acetyl radical, that is to say an acetyl protecting group.

The rubber mixture according to the invention contains at least one silane according to the invention. It is in principle conceivable for the rubber mixture to contain a mixture of a plurality of silanes according to the invention from different embodiments, that is to say possibly with different groups X, Y, A, $R^7$ and G and also $R^1$, $R^2$, possibly $R^3$ and $R^4$, different linkages to the aromatic groups A and also with different values for m. The rubber mixture can in particular also contain a mixture of two or more silanes I), II), III) or VIII). The rubber mixture can also contain the silane according to the invention of illustrated formulae I) to III) and/or VIII) in combination with other silanes known in the prior art, possibly as oligomers, as described hereinabove.

Such coupling agents known from the prior art are in particular bifunctional organosilanes having at least one alkoxy, cycloalkoxy or phenoxy group as a leaving group on the silicon atom and having as another functionality a group which, possibly after cleavage, can enter into a chemical reaction with the double bonds of the polymer. The latter group may for example be the following chemical groups:

—SCN, —SH, —NH$_2$ or -Sx- (with x=2 to 8).

For example, silane coupling agents used may be 3-mercaptopropyltriethoxysilane, 3-thiocyanatopropyltrimethoxysilane or 3,3'-bis(triethoxysilylpropyl) polysulfides having 2 to 8 sulfur atoms, such as for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT may for example also be added as a mixture with carbon black (trade name X50S® from Evonik).

The prior art also discloses a silane mixture which contains 40% to 100% by weight of disulfides, particularly preferably 55% to 85% by weight of disulfides and very particularly preferably 60% to 80% by weight of disulfides. Such a mixture is obtainable for example from Evonik under the trade name Si 266® which is described in DE 102006004062 A1 for example.

Blocked mercaptosilanes as known for example from WO 99/09036 may also be used as a silane coupling agent. Silanes as are described in WO 2008/083241 A1, WO 2008/083242 A1, WO 2008/083243 A1 and WO 2008/083244 A1 can also be used. Usable silanes are for example those marketed under the name NXT (e.g. 3-(octanoylthio)-1-propyltriethoxysilane) in a number of variants by Momentive, USA, or those marketed under the name VP Si 363® by Evonik Industries.

In a particularly advantageous embodiment of the invention, the rubber mixture contains the silane of formula III).

The rubber mixture according to the invention is preferably a rubber mixture which is suitable for use in vehicle tires and for this purpose preferably contains at least one diene rubber.

Diene rubbers are rubbers which are formed by polymerization or copolymerization of dienes and/or cycloalkenes and thus have C═C double bonds either in the main chain or in the side groups.

The diene rubber is selected here from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight $M_w$ of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are used in the production of technical rubber articles, such as belts, drive belts and hoses, and/or footwear soles.

Preferably, the diene rubber is selected from the group consisting of natural polyisoprene and/or synthetic polyisoprene and/or butadiene rubber and/or solution-polymerized styrene-butadiene rubber and/or emulsion-polymerized styrene-butadiene rubber.

In a preferred development of the invention, at least two different types of diene rubber are used in the rubber mixture.

The rubber mixture according to the invention preferably contains at least one silica as filler, by way of which the advantages of the silane according to the invention emerge in particular.

The terms "silicic acid" and "silica" are used synonymously in the context of the present invention.

The silicas may be silicas known to those skilled in the art which are suitable as fillers for tire rubber mixtures. However, particular preference is given to using a finely divided, precipitated silica which has a nitrogen surface area (BET surface area) (in accordance with DIN ISO 9277 and DIN 66132) of 35 to 400 m$^2$/g, preferably of 35 to 350 m$^2$/g, particularly preferably of 100 to 320 m$^2$/g and very particularly preferably of 100 to 235 m$^2$/g, and a CTAB surface area (in accordance with ASTM D 3765) of 30 to 400 m$^2$/g, preferably of 30 to 330 m$^2$/g, particularly preferably of 95 to 300 m$^2$/g and very particularly preferably of 95 to 200 m$^2$/g.

Such silicas result, for example in rubber mixtures for inner tire components, in particularly good physical properties of the vulcanizates. Advantages in mixture processing by way of a reduction in mixing time can also result here while retaining the same product properties, leading to improved productivity. Examples of silicas that can be used thus include not only those of the Ultrasil® VN3 (trade name) type from Evonik but also silicas having a comparatively low BET surface area (such as for example Zeosil® 1115 or Zeosil® 1085 from Solvay) and highly dispersible silicas, so-called HD silicas (for example Zeosil® 1165 MP from Solvay).

The amount of the at least one silica here is preferably 5 to 300 phr, particularly preferably 10 to 200 phr, very particularly preferably 20 to 180 phr. In the case of different silicas, the indicated amounts mean the total amount of silicas present.

The indication "phr" (parts per hundred parts of rubber by weight) used in this document is the conventional indication of quantity for mixture recipes in the rubber industry. The dosage of the parts by weight of the individual substances is based in this document on 100 parts by weight of the total mass of all high molecular weight (Mw greater than 20 000 g/mol) and hence solid rubbers present in the mixture.

The indication "phf" (parts per hundred parts of filler by weight) used in this document is the conventional indication of quantity for coupling agents for fillers in the rubber industry. In the context of the present application, phf relates to the silica present, meaning that any other fillers present, such as carbon black, are not included in the calculation of the amount of silane.

The rubber mixture according to the invention preferably contains at least one silane of formula I), preferably at least the silane of formula II) and/or formula III) and/or formula VIII) in an amount of from 1 to 25 phr and in the preferred case with silica as filler preferably 2 to 20 phf.

The silane(s) according to the invention are preferably added during the production of the rubber mixture according to the invention in at least one base-mixing stage which preferably contains at least one diene rubber and preferably at least one silica as filler.

The present invention thus further provides a process for producing the rubber mixture according to the invention, wherein at least one silane according to the invention as described above is added preferably in at least one base-mixing stage.

In an advantageous embodiment of the invention, the at least one silane according to the invention is adsorbed onto silica beforehand and in this form is mixed into the rubber mixture.

In the process according to the invention for producing the rubber mixture according to the invention, it is therefore preferable if the at least one silane according to the invention is adsorbed onto silica beforehand and in this form is mixed into the rubber mixture.

The present invention further provides a silica which has been modified at least on its surface with at least one silane according to the invention.

By way of example, the modification is effected by at least the following process steps:
 a) dissolving the silane according to the invention in an organic solvent;
 b) bringing at least one silica into contact with the solution from step a) and then stirring the resulting suspension, preferably for 30 minutes to 18 hours;
 c) drying the modified silica obtained.

The rubber base mixture containing at least one silane according to the invention and/or one silica according to the invention is subsequently processed to give a finished rubber mixture by adding vulcanization chemicals, see below in particular a sulfur vulcanization system, and then vulcanized, to obtain a vulcanizate according to the invention of the rubber mixture according to the invention.

The rubber mixture according to the invention can contain carbon black as a further filler, specifically preferably in amounts of 2 to 200 phr, particularly preferably 2 to 70 phr.

The rubber mixture according to the invention may contain further fillers, preferably in minimal amounts, i.e. preferably 0 to 3 phr. Within the context of the present invention, the further (non-reinforcing) fillers include aluminosilicates, kaolin, chalk, starch, magnesium oxide, titanium dioxide, or rubber gels and also fibers (such as for example aramid fibers, glass fibers, carbon fibers, cellulose fibers).

Further, optionally reinforcing, fillers are for example carbon nanotubes ((CNTs), including discrete CNTs, so-called hollow carbon fibers (HCF) and modified CNTs containing one or more functional groups such as hydroxy, carboxy and carbonyl groups), graphite and graphene and what is known as "carbon-silica dual-phase filler".

In the context of the present invention zinc oxide is not included among the fillers.

The rubber mixture can further contain customary additives in customary parts by weight which during the production of said mixture are added preferably in at least one base-mixing stage. These additives include
 a) aging stabilizers, such as for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ),
 b) activators, such as for example zinc oxide and fatty acids (e.g. stearic acid) and/or other activators, such as zinc complexes, such as for example zinc ethylhexanoate,
 c) antiozonant waxes,
 d) resins, especially tackifying resins for inner tire components,
 e) masticating aids, such as for example 2,2'-dibenzamidodiphenyl disulfide (DBD), and
 f) processing aids, such as in particular fatty acid esters and metal soaps, such as for example zinc soaps and/or calcium soaps,
 g) plasticizers, such as in particular aromatic, naphthenic or paraffinic mineral oil plasticizers, such as for example MES (mild extraction solvate) or RAE (residual aromatic extract) or TDAE (treated distillate aromatic extract), or rubber-to-liquid (RTL) oils or biomass-to-liquid (BTL) oils, preferably having a content of polycyclic aromatics of less than 3% by weight according to method IP 346 or triglycerides, such as for example rapeseed oil, or factices or hydrocarbon resins or liquid polymers, the mean molecular weight of which (determination by GPC=gel permeation chromatography, using a method based on BS ISO 11344: 2004) is between 500 and 20000 g/mol, with mineral oils being particularly preferred as plasticizers.

When using mineral oil this is preferably selected from the group consisting of DAE (distillate aromatic extracts) and/or RAE (residual aromatic extract) and/or TDAE (treated distillate aromatic extracts) and/or MES (mild extracted solvents) and/or naphthenic oils.

The total amount of further additives is 3 to 150 phr, preferably 3 to 100 phr and particularly preferably 5 to 80 phr.

Zinc oxide (ZnO) may be included in the total proportion of further additives in the abovementioned amounts.

This may be any type of zinc oxide known to those skilled in the art, such as for example ZnO granules or powder. The zinc oxide conventionally used generally has a BET surface area of less than 10 $m^2/g$. However, it is also possible to use a zinc oxide having a BET surface area of 10 to 100 $m^2/g$, for example so-called "nano zinc oxides".

The vulcanization of the rubber mixture according to the invention is preferably conducted in the presence of sulfur and/or sulfur donors with the aid of vulcanization accelerators, it being possible for some vulcanization accelerators to act simultaneously as sulfur donors. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS) or a guanidine accelerator such as diphenylguanidine (DPG).

The sulfur donor substances used may be any sulfur donor substances known to those skilled in the art. If the rubber mixture contains a sulfur donor substance, the latter is preferably selected from the group comprising for example thiuram disulfides, such as for example tetrabenzylthiuram disulfide (TBzTD) and/or tetramethylthiuram disulfide (TMTD) and/or tetraethylthiuram disulfide (TETD) and/or thiuram tetrasulfides, such as for example dipentamethylenethiuram tetrasulfide (DPTT), and/or dithiophosphates, such as for example DipDis (bis(diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N, N-dibenzylthiocarbamoyldithio)hexane and/or diaryl polysulfides and/or dialkyl polysulfides.

Further network-forming systems such as can be obtained for example under the trade names Vulkuren®, Duralink® or Perkalink®, or network-forming systems such as are described in WO 2010/049216 A2, can also be used in the rubber mixture. This system contains a vulcanizing agent which crosslinks with a functionality of greater than four and at least one vulcanization accelerator.

It is particularly preferable to use the accelerators TBBS and/or CBS and/or diphenylguanidine (DPG).

Vulcanization retarders may also be present in the rubber mixture.

The terms "vulcanized" and "crosslinked" are used synonymously in the context of the present invention.

In a preferred development of the invention, a plurality of accelerators are added in the final mixing stage during the production of the sulfur-crosslinkable rubber mixture.

The sulfur-crosslinkable rubber mixture according to the invention is produced by the process that is customary in the rubber industry, in which in one or more mixing stages a base mixture comprising all constituents except for the vulcanization system (sulfur and vulcanization-influencing substances) is firstly produced. The finished mixture is produced by adding the vulcanization system in a final mixing stage. The finished mixture is for example processed further and brought into the appropriate shape by means of an extrusion operation or calendering.

This is followed by further processing by vulcanization, wherein sulfur crosslinking takes place due to the vulcanization system added within the context of the present invention.

The above-described rubber mixture according to the invention is particularly suitable for use in vehicle tires, especially pneumatic vehicle tires. Application in all tire components is in principle conceivable here, in particular in a tread, especially in the cap of a tread of cap/base construction.

The cap here is the part of the tread of the vehicle tire that comes into contact with the driving surface, while the base is the inner part of the tread that is located radially beneath the cap and does not come into contact with the driving surface.

For use in vehicle tires, the mixture, as a finished mixture prior to vulcanization, is preferably brought into the shape of a tread and is applied in the known manner during production of the green vehicle tire.

The production of the rubber mixture according to the invention, for use as a sidewall or other body mixture in vehicle tires, is effected as has already been described. The difference lies in the shaping after the extrusion operation/the calendering of the mixture. The shapes thus obtained of the as-yet unvulcanized rubber mixture for one or more different body mixtures then serve for the construction of a green tire.

"Body mixture" refers here to the rubber mixtures for the inner components of a tire, such as essentially squeegee, inner liner (inner layer), core profile, belt, shoulder, belt profile, carcass, bead reinforcement, bead profile, flange profile and bandage. The as-yet unvulcanized green tire is subsequently vulcanized.

For use of the rubber mixture according to the invention in drive belts and other belts, especially in conveyor belts, the extruded, as-yet unvulcanized mixture is brought into the appropriate shape and often provided at the same time or subsequently with strength members, for example synthetic fibers or steel cords. This usually affords a multi-ply construction consisting of one and/or more plies of rubber mixture, one and/or more plies of identical and/or different strength members and one and/or more further plies of the same and/or another rubber mixture.

The present invention further provides a vehicle tire comprising the rubber mixture according to the invention containing at least one silane according to the invention in at least one component.

The vulcanized vehicle tire in at least one component comprises a vulcanizate of at least one rubber mixture according to the invention. It is known to those skilled in the art that most substances, such as for example the rubbers and silanes present, in particular the silane according to the invention, are present in chemically modified form either already after mixing or only after vulcanization.

Within the context of the present invention, "vehicle tires" are to be understood to mean pneumatic vehicle tires and solid rubber tires, including tires for industrial and construction site vehicles, truck, car and two-wheeled-vehicle tires.

The vehicle tire according to the invention preferably comprises the rubber mixture according to the invention at least in the tread.

The vehicle tire according to the invention preferably comprises the rubber mixture according to the invention at least in the sidewall.

The rubber mixture according to the invention is further also suitable for other components of vehicle tires, such as for example in particular the flange profile, and also for inner tire components. The rubber mixture according to the invention is further also suitable for other technical rubber articles, such as bellows, conveyor belts, air springs, belts, drive belts or hoses, and also footwear soles.

The invention shall be explained in more detail hereinbelow with reference to exemplary embodiments.

The silane of formula III), as an example according to the invention, was prepared in the following way:

1. Preparation of 1-(4'-Aminophenyl)-3-(3-(Triethoxysilyl)Propyl)Urea According to the Synthesis Scheme of Formula IV)

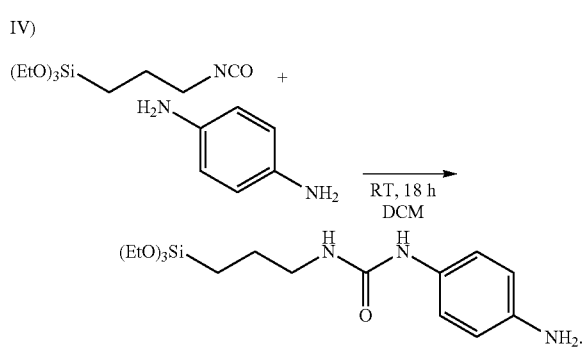

3-(Isocyanatopropyl)triethoxysilane (11.44 ml, 11.44 g, 46.2 mmol, 1.0 eq.) was added dropwise at room temperature (RT) to a solution of para-phenylenediamine (10.00 g, 92.5 mmol, 2.0 eq.) in dichloromethane (300 ml of DCM). After stirring overnight, the solvent was removed on a rotary evaporator, affording a gray solid (21.57 g) as the crude product.

Purification by column chromatography was performed in a plurality of small portions of approx. 3-4 g each (approx. 74% by weight yield in each case) on silica gel (DCM/ethanol 9:1).

After drying under high vacuum, the target compound was isolated in the form of a light gray solid (extrapolated for the total product: 15.96 g, 44.9 mmol, 97% based on silane).

$^1$H NMR (nuclear magnetic resonance) (500 MHz, DMSO-d$_6$) δ 7.82 (s, 1H), 6.98 (d, J=8.7 Hz, 2H), 6.45 (d, J=8.7 Hz, 2H), 5.91 (t, J=5.8 Hz, 1H), 4.66 (s, 2H), 3.74 (q, J=7.0 Hz, 6H), 3.00 (q, J=6.8 Hz, 2H), 1.48-1.39 (m, 2H), 1.14 (t, J=7.0 Hz, 9H), 0.57-0.49 (m, 2H).

$^{13}$C NMR (126 MHz, DMSO-d$_6$) δ 155.69, 143.33, 129.62, 120.22, 114.12, 57.70, 41.81, 23.49, 18.24, 7.25.

2. Preparation of 4-(Octanoylthio)Benzoic Acid According to the Synthesis Scheme of Formula V)

dinium salt and precipitate out the target molecule. The reaction mixture was stirred for 30 min.

The resulting light brown precipitate was filtered off using a Buchner funnel and washed with cold demineralized water (2×50 ml).

After drying under high vacuum, the target compound was isolated in the form of a light brown powder (1.38 g, 4.9 mmol, 49%).

Melting point: 170° C.

$^1$H NMR (500 MHz, DMSO-d$_6$) δ 14.10 (s, 1H), 8.89 (d, J=8.0 Hz, 2H), 8.44 (d, J=7.9 Hz, 2H), 3.62 (t, J=7.4 Hz, 2H), 2.04-2.27 (m, 8H), 1.75 (t, J=6.6 Hz, 3H).

$^{13}$C NMR (126 MHz, DMSO-d$_6$) δ 195.88, 166.77, 134.24, 132.90, 131.47, 129.95, 43.30, 31.12, 28.38, 28.21, 25.00, 22.09, 13.99.

ESI-MS (electrospray ionization mass spectrometry) m/z (%): 281.12 [M+H]$^+$ (100), 303.10 [M+Na]$^+$ (73), 583.21 [2M+Na]$^+$ (59).

3. Preparation of 4-(Octanoylthio)Benzoyl Chloride (In Situ) According to the Synthesis Scheme of Formula VI)

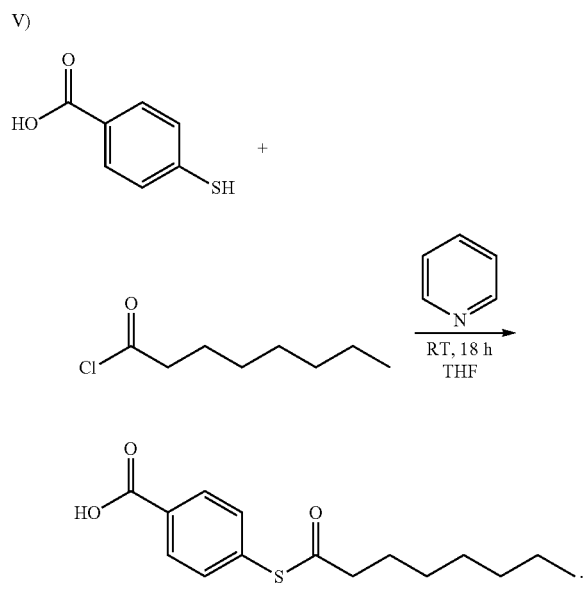

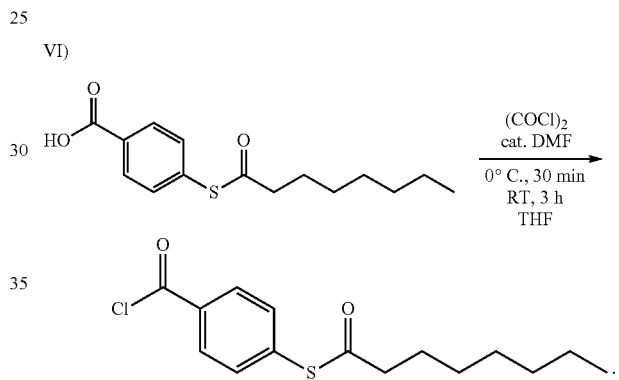

DMF (0.1 ml, 1.3 mmol) was added to a suspension of 4-(octanoylthio)benzoic acid (0.84 g, 3.0 mmol, 1.0 eq.) in THF (20 ml). Oxalyl chloride (1.3 ml, 1.91 g, 15.0 mmol, 5.0 eq.) was added dropwise to the reaction mixture at 0° C. and the mixture was stirred for 30 min at this temperature.

The resulting yellow solution was then stirred for a further 3 h at RT. Thereafter, the solvent and excess oxalyl chloride were removed by means of a high vacuum and cold trap.

A yellow solid was isolated that was used for the next synthesis step without further analysis or purification (on account of its reactivity).

Octanoyl chloride (1.7 ml, 1.63 g, 10.0 mmol, 1.0 eq.) was added dropwise at RT to a solution of 4-mercaptobenzoic acid (1.54 g, 10.0 mmol, 1.0 eq.) and pyridine (5.0 ml, 4.91 g, 62.1 mmol, 6.2 eq.) in THF (15 ml; tetrahydrofuran).

The resulting suspension was stirred overnight at RT and subsequently poured onto ice in order to remove the pyri- 4. Preparation of the Silane of Formula Iii) According to the Synthesis Scheme of Formula VII)

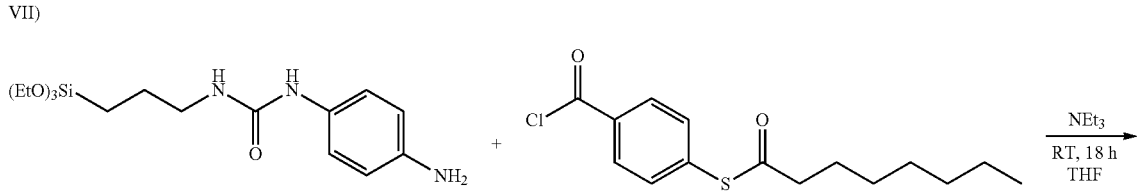

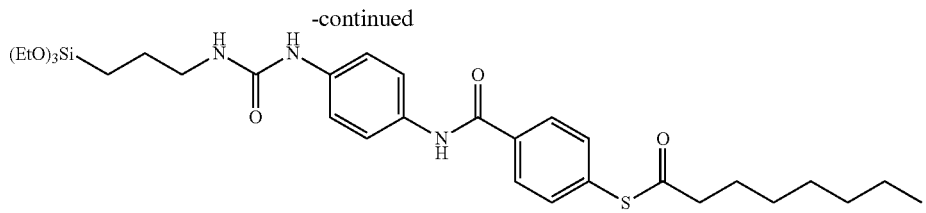

A solution of 4-(octanoylthio)benzoyl chloride (0.90 g, 3.0 mmol, 1.0 eq.) in THF (10 ml) was added dropwise at RT, over a period of 15 min, to a solution of 1-(4'-aminophenyl)-3-(3"-(triethoxysilyl)propyl)urea (1.07 g, 3.0 mmol, 1.0 eq.) and triethylamine (2.1 ml, 1.52 g, 15.0 mmol, 5.0 eq.) in THF (10 ml).

The resulting white suspension was stirred overnight at RT and then filtered off using a Buchner funnel. The filter cake was washed with cold THF (2×50 ml) and demineralized water (4×50 ml). The powder obtained after drying was resuspended in water for 30 min in order to remove ammonium salts still present.

After drying under high vacuum, the target compound was isolated in the form of a white powder (1.45 g, 2.3 mmol, 78% yield).

Melting point: 158° C.

$^1$H NMR (500 MHz, DMSO-$d_6$) δ 10.23 (s, 1H), 8.37 (s, 1H), 7.95-8.02 (m, 2H), 7.58-7.64 (m, 2H), 7.52-7.57 (m, 2H), 7.33-7.39 (m, 2H), 6.14 (t, J=5.7 Hz, 1H), 3.75 (q, J=7.0 Hz, 6H), 3.05 (q, J=6.6 Hz, 2H), 2.74 (t, J=7.4 Hz, 2H), 1.57-1.65 (m, 2H), 1.48 (ddd, J=10.8, 5.2, 2.8 Hz, 2H), 1.21-1.34 (m, 8H), 1.15 (t, J=7.0 Hz, 9H), 0.83-0.89 (m, 3H), 0.51-0.59 (m, 2H).

$^{13}$C NMR (126 MHz, DMSO-$d_6$) δ 196.18, 164.35, 155.23, 136.76, 135.86, 134.14, 132.48, 131.01, 128.37, 121.08, 117.73, 57.75, 43.26, 41.80, 31.12, 28.38, 28.22, 25.02, 23.42, 22.09, 18.28, 13.99, 7.29.

$^{29}$Si NMR (99 MHz, DMSO-$d_6$) δ −44.56.

ESI-MS m/z (%): 618.30 [M+H]$^+$ (100), 640.28 [M+Na]$^+$ (18).

The silane of formula VIII), as a further example according to the invention, is prepared for example in the following way:

1. Preparation of 3-(Acetylthio)Propionic Acid According to the Synthesis Scheme of Formula IX)

IX)

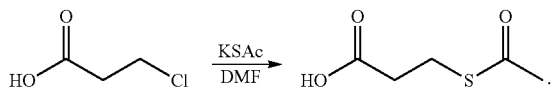

This introduces a thioacetyl group by nucleophilic substitution of 3-chloropropionic acid with potassium thioacetate (KSAc) and DMF (dimethylformamide) as solvent.

2. Preparation of 3-(Acetylthio)Propionyl Chloride (In Situ) According to the Synthesis Scheme of Formula X)

X)

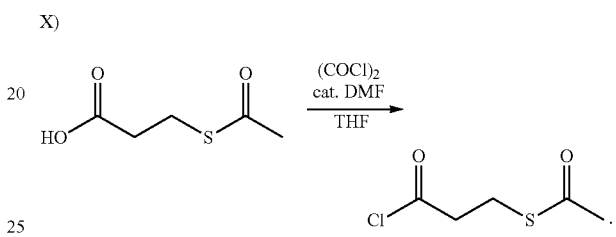

This activates the acid functionality with oxalyl chloride (COCl)$_2$ and catalytic amounts of DMF in THF as solvent.

3. Preparation of 1-(4'-Aminophenyl)-3-(3-(Triethoxysilyl)Propyl)Urea According to the Synthesis Scheme of Formula XI)

XI)

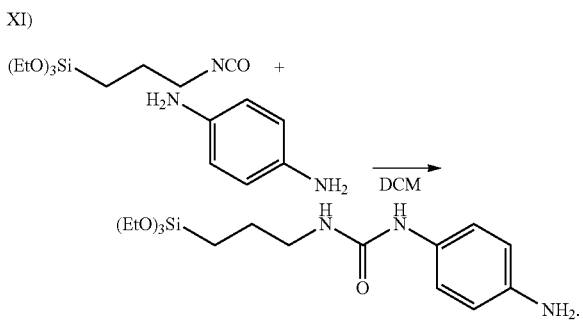

This forms the urea by reaction of para-phenylenediamine and one equivalent of 3-(isocyanatopropyl)triethoxysilane in DCM (dichloromethane) as solvent.

4. Preparation of the Silane Of Formula Viii) According to the Synthesis Scheme of Formula XII)

XII)

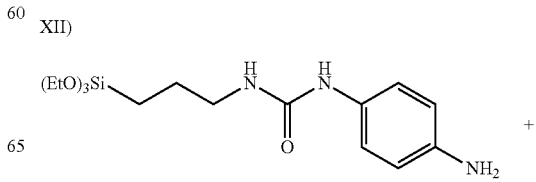

-continued

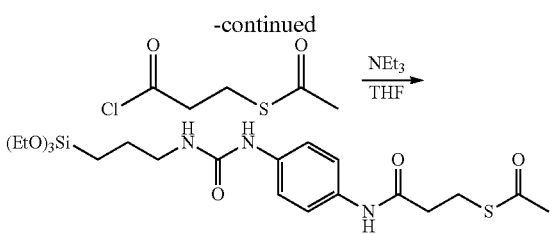

This forms the amide by reaction of 3-(acetylthio)propionyl chloride with 1-(4'-aminophenyl)-3-(3"-triethoxysilyl)propyl)urea in the presence of triethylamine as auxiliary base and THF as solvent.

The silane of formula VIII) can also be prepared by starting from 3-chloropropionyl chloride and converting it to the amide with 1-(4'-aminophenyl)-3-(3"-triethoxysilyl)propyl)urea and only then introducing the thioacetyl group by nucleophilic substitution of the chloride (with potassium thioacetate).

The prepared silane of formula III) and/or VIII) is mixed into a rubber mixture according to the invention containing at least one diene rubber and at least one silica as filler. To this end, the silane of formula III) and/or VIII) is preferably adsorbed onto a silica beforehand and subsequently added in this form to the rubber mixture.

Adsorption onto silica is carried out, for example, as follows:

To a suspension of silica, for example granulated silica, in DMF is added, at room temperature, a solution of the silane of formula III) and/or VIII) dissolved in DMF in the desired silica/silane ratio. For example, 30.0 g of silica (VN3, Evonik) and 4.43 g of the silane of formula III) or 3.32 g of the silane of formula VIII) are used.

The resulting suspension is for example stirred overnight at 120° C. and the solvent is subsequently removed under reduced pressure. After drying for one day under high vacuum at 40° C., the modified silica thus obtained is comminuted by means of a mortar possibly according to the fineness desired. It is then for example dried under high vacuum for a further day at 40° C.

The rubber mixture according to the invention is by way of example applied in the form of a preformed tread of a vehicle tire (as described above) to a green tire and subsequently vulcanized with the latter.

The invention claimed is:
1. A silane of formula I):

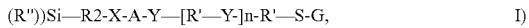

wherein o can be 1, 2 or 3; and,
the radicals $R^1$ within the silyl groups $(R^1)_o Si$— are identical or different from each other and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides, or the radicals R1 are alkyl polyether groups —O—($R^6$—O)$_r$—$R^5$ wherein $R^6$ are identical or different and are branched or unbranched, saturated or unsaturated, aliphatic, aromatic or mixed aliphatic/aromatic bridging $C_1$-$C_{30}$ hydrocarbon groups, r is an integer from 1 to 30, and $R^5$ are unsubstituted or substituted, branched or unbranched, terminal alkyl, alkenyl, aryl or aralkyl groups, or two $R^1$ form a cyclic dialkoxy group having 2 to 10 carbon atoms in which case 0 is <3,
or two or more silanes of formula I) can be bridged via radicals $R^1$; and wherein the radical $R^2$ is selected from the group consisting of linear and branched alkylene groups having 1 to 20 carbon atoms, cycloalkyl groups having 4 to 12 carbon atoms, aryl groups having 6 to 20 carbon atoms, alkenyl groups having 2 to 20 carbon atoms, alkynyl groups having 2 to 20 carbon atoms and aralkyl groups having 7 to 20 carbon atoms; and wherein the group X is selected from the groups
—HNC(=O)—, —C(=O)NH—, —C(=O)O—, —OC(=O)—, —OC(=O)NH—,
—HNC(=O)O—, —$R^3$NC(=O)N$R^3$—, —$R^3$NC(=N$R^3$)N$R^3$—, —$R^3$NC(=S)N$R^3$—, wherein the radicals R3 within the group X may be identical or different and are selected from a hydrogen atom or as defined for R2 under the condition that at least one R3 within the group X is a hydrogen atom; and wherein the groups A within a molecule may be identical or different from each other and are aromatic groups; and wherein the radicals R' within a molecule may be identical or different and are selected from aromatic groups A and alkylene radicals having 1 to 20 carbon atoms, which may have cyclic, branched and/or aliphatically unsaturated groups; and wherein G is a hydrogen atom or a —C(=O)—$R^8$ group or a —Si$R^8_3$; group, wherein $R^8$ is selected from linear, branched and cyclic $C_1$-$C_{20}$-alkyl groups, $C_6$-$C_{20}$-aryl groups, $C_2$-$C_{20}$-alkenyl groups and $C_7$-$C_{20}$-aralkyl groups; and wherein the groups Y within a molecule may be identical or different from each other and are selected from the groups
—HNC(=O)—, —C(=O)NH—, —C(=O)O—, —OC(=O)—, —OC(=O)NH—,
—HNC(=O)O—, —$R^4$NC(=O)N$R^4$—, —R4NC(=N$R^4$)N$R^4$—, —$R^4$NC(=S)N$R^4$—, wherein the radicals $R^4$ within a group Y and within a molecule may be identical or different and are selected from a hydrogen atom or as defined for $R^2$ under the condition that at least one $R^4$ within each group Y is a hydrogen atom; and wherein m is an integer from 0 to 4, and wherein the silane may also be in the form of oligomers which are formed by hydrolysis and condensation of silanes of formula I).

2. The silane as claimed in claim 1, wherein m=0.
3. The silane as claimed in claim 1, wherein X is selected from the group consisting of:
—HNC(=O)—, —C(=O)NH—, —OC(=O)NH—,
—HNC(=O)O—, —$R^3$NC(=O)N$R^3$—,
—$R^3$NC(=N$R^3$)N$R^3$—, and —$R^3$NC(=S)N$R^3$—.

4. The silane as claimed in claim 1, wherein Y is selected from the group consisting of:
—HNC(=O)—, —C(=O)NH—, —OC(=O)NH—,
—HNC(=O)O—, —$R^4$NC(=O)N$R^4$—,
—$R^4$NC(=N$R^4$)N$R^4$—, and —$R^4$NC(=S)N$R^4$—.

5. The silane as claimed in claim 1, wherein the radicals R' are linear or branched alkylene radicals having 1 to 20 carbon atoms, or cycloalkyl groups having 4 to 8 carbon atoms.

6. The silane as claimed in claim 1, wherein the radicals $R^7$ are aromatic groups A.

7. The silane as claimed in claim 1, wherein A is selected from the group consisting of phenylene, naphthylene, pyridyl, pyridazyl, pyrimidyl, pyrazyl, triazyl, quinolyl, pyrrolyl, furanyl, thiophenyl, pyrazolyl, imidazolyl, thiazolyl and oxazolyl radicals, and derivatives of the groups thereof.

8. The silane as claimed in claim 1 having formula II):

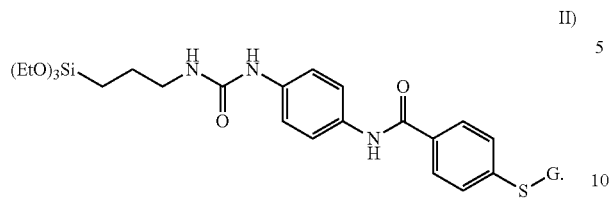

9. The silane as claimed in claim 1 having formula III):

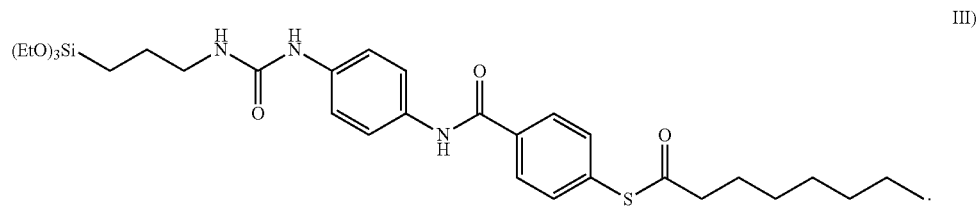

10. The silane as claimed in claim 1, wherein the radicals $R^7$ are a linear alkylene radical.

11. The silane as claimed in claim 1, wherein the radicals R' are a linear alkylene radical, and G is an alkanoyl group.

12. The silane as claimed in claim 1 having formula VIII):

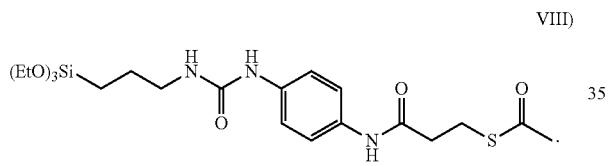

13. The silane as claimed in claim 1 further comprised on the surface of silica.

14. The silane as claimed in claim 13 further comprised in a rubber mixture.

15. The silane as claimed in claim 14 further comprised in at least one component of a vehicle tire.

* * * * *